United States Patent [19]

Lo Curto et al.

[11] Patent Number: 5,200,978
[45] Date of Patent: Apr. 6, 1993

[54] PROCESS FOR ACTUATION OF MULTI-LEVEL DIGITAL MODULATION BY A DIGITAL SIGNAL PROCESSOR

[75] Inventors: Michelangelo Lo Curto, Seregno; Marcello Salerno, Gorgonzola, both of Italy

[73] Assignee: Siemens Telecomunicazioni S.p.A, Italy

[21] Appl. No.: 681,965

[22] Filed: Apr. 8, 1991

[30] Foreign Application Priority Data

May 18, 1990 [IT] Italy .................... 20380 A/90

[51] Int. Cl.$^5$ ............ H04C 25/34; H04C 25/49; H03H 7/30
[52] U.S. Cl. ...................... 375/17; 375/15; 375/59
[58] Field of Search ............ 375/17, 59, 39, 11, 375/15; 364/724.16, 724.19

[56] References Cited

U.S. PATENT DOCUMENTS 4,748,626  5/1988  Wong .................... 375/17 X

Primary Examiner—Curtis Kuntz
Assistant Examiner—Tesfaldet Bocure
Attorney, Agent, or Firm—Hill, Steadman & Simpson

[57] ABSTRACT

A process for actuation of multi-level digital modulation, and in particular QAM modulation, by using a single microprocessor is described. The process calls for synchronism of all the frequencies in play. The symbols of the "in phase" and "in quadrature" channels and are oversampled and appropriately digitally filtered. A digital carrier is QAM modulated simply by selecting in string the symbols belonging to the digitally filtered channels taken with their true or negated value. These symbols are then sent to a digital/analog converter followed by a reconstruction filter to obtain the corresponding QAM modulated analog carrier.

7 Claims, 4 Drawing Sheets

PROCESS FOR ACTUATION OF MULTI-LEVEL DIGITAL MODULATION BY A DIGITAL SIGNAL PROCESSOR

BACKGROUND OF THE INVENTION

The present invention relates to the field of digital modulation of sinusoidal carriers, and more specifically to a process for actuation of multi-level digital modulation by a digital signal processor.

In multi-level digital modulation, the modulating signal is generally in the form of a flow of serial bits with a frequency of fb bits. This flow is converted into N parallel flows of bits (N=1, 2, 3 . . . ) of which the N bits, which are present simultaneously in the N flows, form words denominated by symbols having a symbol frequency $fs=fb/N$.

Each N bit symbol can express a number of 2N different combinations of bits. The number 2N is termed the modulation level.

For low modulation levels (2N=2, 4, 8), there is ordinarily used PSK (Phase Shift Keying) modulation which associates with each symbol one phase of a carrier.

For higher levels of modulation, recourse is usually had to QAM (Quadrature Amplitude Modulation) modulation which associates with each symbol not only the phase, but also the level, of a carrier. The possible 2N values of the phases and level combinations of the modulated carrier are generally represented by a constellation of points in a Cartesian plane, the axes of which represent two mutually sinusoidal quadrature carriers.

Each point of the constellation is identified by a vector which departs from the origin of the plane. The components of the vectors in relation to the Cartesian axes are obtained directly from the symbols by an operation termed 'mapping' which associates with each symbol two other symbols whose values are the above components. The associated symbols form two flows with frequency fs, termed 'in phase' channel I and 'in quadrature' channel Q, respectively.

In a conventional QAM modulator, the symbols of the I and Q channels are converted from digital to analog and are filtered with two shaping filters to appropriately shape the spectrum of the two analog signals obtained. These signals are then used to modulate two synchronous sinusoidal carriers in quadrature with each other. The modulated carriers are added together to obtain a single modulated carrier in the desired QAM mode.

Shaping of the above mentioned spectrum is performed by a filtration described as 'optimum' for the symbols belonging to the in phase and in quadrature channels.

In view of the foregoing, a conventional QAM modulator includes the following:
- a series/parallel converter to convert the serial input flow into N parallel bit flows;
- a mapping memory to obtain the I and Q channels starting from the N parallel flows;
- two digital/analog converters for conversion of the symbols of the I and Q channels into continuous values;
- two 'optimum' analog filters placed after said converters;
- two analog multipliers to whose first inputs arrive the output signals from the 'optimum' filters, to whose second inputs arrive two sinusoidal in quadrature carriers, and whose outputs are the above said amplitude modulated carriers respectively, and
- an analog adder to whose inputs arrive the outputs of the multipliers and whose output is a single QAM modulated carrier.

The conventional modulator, however, has a serious drawback due to the fact that the gain of the analog multipliers shows strong tolerances and is susceptible to thermal drift which introduces phase and amplitude inaccuracies in the modulated signal. The consequences of these inaccuracies are noticed mainly at the higher modulation levels (N>4).

These shortcomings are overcome by having recourse to QAM modulators of a second type provided in a known manner completely in the digital mode.

Such modulators do not require the two digital/analog converters in the I and Q channels as in the above converters because the respective symbols undergo the 'optimum' filtration directly in the digital mode. The filtered symbols are also multiplied digitally by the values of the sinusoidal in quadrature carriers appropriately digitalized. The digital samples of the product are converted into analog and are filtered by means of a low pass filter, termed 'reconstruction', to eliminate the unwanted spectral components and to obtain the modulated sinusoidal carrier QAM.

As is known, to digitally filter signals, it is first necessary to sample them with a sampling frequency fc whose value must be equal to at least twice the maximum frequency contained in the band of the signal to be sampled. In the case in question, the signals to be sampled correspond to the symbols of the I and Q channels, and the maximum frequency corresponds to the symbol frequency fs.

The spectrum of a sampled signal is formed of an infinite series of spectra of the signal in base band placed around whole multiples of the frequency fc constituting overall a repetition spectrum.

To further space the repeated spectra, it is useful to perform an oversampling of the symbols at the frequency $fc=fs \times K$ where K is a whole number >2 representing the number of samples per symbol.

The value of K is selected so that the distance between two repeated spectra is broad enough for an embodiment of the reconstruction filter with a slope which is not overly steep for the attenuation characteristic with the frequency.

The QAM modulators of the second type have, however, a considerable circuit complexity due mainly to the high number of multipliers included in the digital filter placed on the I and Q channels, a number which will be greater in proportion to the accuracy of the filter and the higher the sampling frequency fc selected.

SUMMARY OF THE INVENTION

An object of the present invention is to overcome the above shortcomings and provide a process for actuation of the multi-level digital modulation which, considering the string of operation phases of a hypothetical circuit taken as a whole, allows minimization of the number of operations necessary to complete the modulation.

The process in question shows itself to be particularly well suited to implementation by a single microprocessor specialized in real time digital signal processing (DSP).

According to the process and system of the invention, a single microprocessor designed for processing digital signals in real time is provided. In the multi-level digital modulation process of the invention, a serial flow having a bit frequency fb is parallelized to form first words of N bits called symbols having a symbol frequency fs from which are generated in synchronism second and third words respectively belonging to a channel termed "in phase" and a channel termed "in quadrature" representing components along two orthogonal axes of a vector which digitally modulates a sinusoidal carrier both in phase and in amplitude. The second and third words having a symbol frequency fs are digitally filtered at a sampling frequency fc synchronous with the symbol frequency fs and corresponding to the symbol frequency fs multiplied by an appropriate number K greater than 2. The sinusoidal carrier modulated digitally both in phase and amplitude has a frequency of which is synchronous with the sampling frequency fc and which is equal to one-fourth of the sampling frequency fc. The digital filtering comprises cycles divided in four time intervals corresponding to an equal number of consecutive periods of the sampling frequency fc, there being generated in an orderly manner in said cycles fourth, fifth, sixth, and seventh words corresponding to the second and third filtered words and to second and third negated filtered words considered in an associated time interval. The fourth, fifth, sixth, and seventh words are provided as discrete samples of the digitally modulated sinusoidal carrier.

The process which is the object of the invention allows the embodiment of the QAM modulator by means of a single DSP and permits considerable circuit simplification as compared with an embodiment with conventional circuits.

DESCRIPTION OF THE PREFERRED EMBODIMENTS

Figure 1:
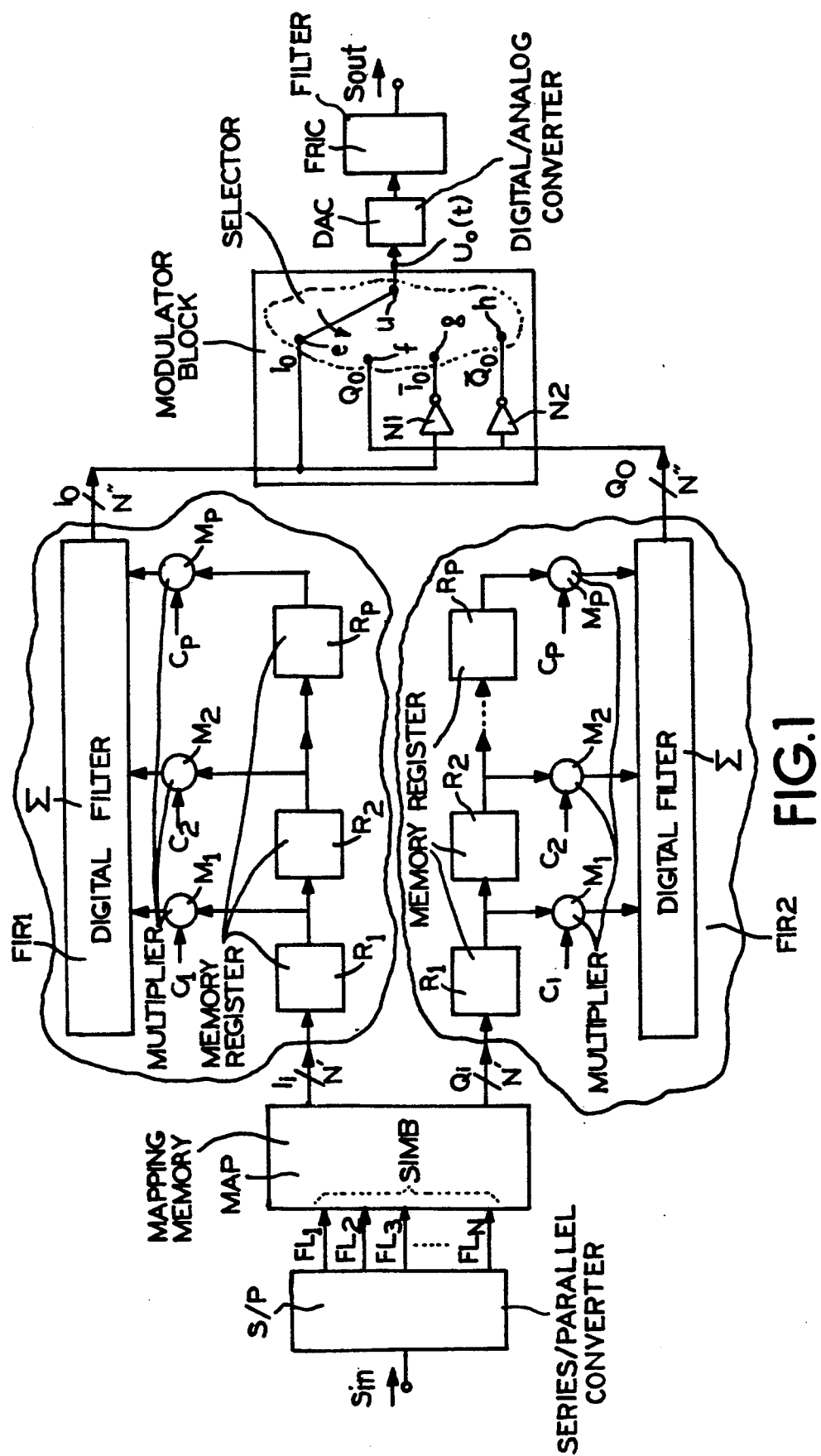
FIG. 1 shows a block diagram of a hypothetical QAM circuit modulator which actuates the modulation process which is an object of the present invention.

With reference to FIG. 1 there is noted a series/parallel S/P converter having an input of a serial flow of $S_{in}$ bits with frequency fb and an output N of parallel flows of bits at the frequency $fs = fb/N$. As stated above, the bits on the N flows at the end of each individual phase of parallelization form words of N bits called symbols, and having a symbol frequency fs. The N flows reach the input of a mapping memory MAP which associates with each input symbol two new symbols at the output, each having a number of bits n' = Integer [N/2] approximated to the nearest greater whole number.

The symbols output from the block MAP, indicated by Ii and Qi, belong to two parallel flows of bits at frequency fs which form two channels, termed 'in phase' channel I and 'in quadrature' channel Q, respectively.

The symbols Ii and Qi reach the input of two identical transverse digital filters FIR1 and FIR2 respectively, with 'p' taps, and have a finite pulse response (FIR) similar to that of an 'optimum' transmission filter.

As mentioned above, the symbols at the input of the digital filters are sampled with a frequency of $fx = fs \times K$.

Each of the two filters FIR1 and FIR2 is embodied in a known manner and includes a number 'p' of memory registers R1, R2, ... Rp, a number 'p' of digital multipliers M1, M2, ... Mp, and an adder Z with 'p' inputs where the number 'p' will be selected in accordance with the criteria defined below.

The registers are arranged in sequence with the first R1 coinciding with the input of the respective filter FIR1 or FIR2. Each register memorizes a sample for an interval of time $T = 1/fc$ at the end of which it transfers it to the subsequent register, delaying it by T. During each interval T, the delayed samples are sent to first inputs of the multipliers M1, M2, ... Mp, to second inputs of which arrive coefficients C1, C2, ... Cp, of N" bits unvarying in time. The products output from the multipliers reach the inputs of the respective adders Z, which add them together at each interval T, producing at the outputs symbols of N" bits indicated by Io and Qo.

The symbols Io and Qo correspond to the symbols Ii and Qi respectively after the digital filtration.

These symbols Io and Qo reach two distinct inputs of a modulator block MOD for modulation of two respective sinusoidal carriers digitalized together in quadrature.

This block includes two inverters N1, N2 and an electronic selector SEL with four inputs (e, f, g, h) placed in a string, and an output point u coinciding with the output of the block MOD.

The symbols Io directly reach the input point e of the selector SEL and the point g through the inverter N1; the symbols Qo directly reach the input point f of the selector SEL and the point h through the inverter N2.

The selector SEL selects with timing cadence T the signal present at one of the input points in the string e, f, g, h and transfers it to the output point u. The resulting output flow from the block MOD reaches a digital/analog converter DAC of known type whose output is connected to a low pass reconstruction filter FRIC also of known type.

The signal Sout output from the filter FRIC is the output signal of the modulator circuit QAM indicated in the figures.

In operation, the block MOD performs amplitude modulation of two sinusoidal carriers digitalized in quadrature with each other using as modulating signals the filtered signals Io and Qo respectively. These carriers are not shown in the figures because, as will be clarified below, they are not really necessary.

Another function of the block MOD is for sending to the digital/analog converter DAC the sum of the modulated carriers for obtaining a single modulated digital carrier QAM indicated by Uo(t).

As is known, amplitude modulation of digital signals is achieved by digitally multiplying samples of the carrier signals by samples of the modulating signals.

From the explanation of the circuit of the block MOD it may, however, be noted that this block contains no multiplying or adding circuits. This circuit simplification is made possible by some peculiarities of the process being discussed. More specifically:

the two digitalized sinusoidal carriers phase shifted with each other by one fourth of a period are synchronous with the sampling frequency fc, the frequency fo of the two carriers is assumed equal to ¼ of the sampling frequency fc so as to obtain four samples for each period of these carriers, and the carriers are sampled at their highest, lowest, and null levels coinciding with the standardized levels equal to +1, −1 and 0, respectively.

According to these hypotheses, the strings of samples for the two carriers, which are obtained at intervals T, are the following:

| In phase carrier | +1 | 0 | −1 | 0 | +1 |
|---|---|---|---|---|---|
| In quadrature carrier | 0 | +1 | 0 | −1 | 0 |

The corresponding strings of symbols Io and Qo are:

| Io(T) | Io(T-1) | Io(T-2) | Io(T-3) |
|---|---|---|---|
| Qo(T) | Qo(T-1) | Qo(T-2) | Qo(T-3) |

The corresponding strings of samples associated with the two modulated carriers and obtained by multiplying carrier samples by modulating signal samples are:

| +Io(T) | 0 | −Io(T-2) | 0 |
|---|---|---|---|
| 0 | +Qo(T-1) | 0 | −Qo(T-3) |

The string of samples obtained from the sum of the two preceding strings is:

$$Uo(t) = +Io(T) + Qo(T-1) - Io(T-2) - Qo(T-3) \ldots$$

These samples are indicated in FIG. 1 by Io, Qo, $\overline{Io}$, $\overline{Qo}$.

As may be seen, the amplitude modulation performed by the block MOD is reduced to a choice of samples, true or negated, made on the symbols Io and Qo coming from 'in phase' and 'in quadrature' channels. This justifies what was said above concerning the fact that in reality no carrier reaches the block MOD.

Sizing of the digital filters FIR1 and FIR2 involves determination of a 'period of observation' of the input signals which correspond to the time employed by a symbol Ii or Qi to pass through the respective digital filter. This is equivalent to a determination of the number M of symbols simultaneously present in the filter memory registers.

The total length of each filter, which corresponds to the number 'p' of taps, is given by the following formula:

$$p = M \times K$$

where $K = fc/fs$ is the number of samples per symbol.

The value of M depends mainly on the degree of accuracy required of the filters.

In view of the foregoing, the value of K must cause a mutual spacing of the repeated spectra higher than the minimum allowed, obtained by K=2, so as to permit a ready embodiment of the reconstruction filter FRIC.

Choosing, for example, K=4 and M=4, we have:

fc=4fs p=16

With K=8 and M=4, we have fc=8fs p=32, etc.

The reconstruction filter can only be simplified by increasing the length of the digital filters. This complication is, however, easy to overcome. Indeed, from the oversampling operation performed, for every value of K it is possible to make the first of the K samples per symbol equal to the value of the symbol, and all the bits of the subsequent K − 1 samples equal to zero. It follows that a large part of the products inside the digital filters are null. Therefore, for each filter, the number of multiplications really necessary is reduced to one for each symbol time for the number M of symbols contained in the filter, regardless of the value of K. Considering the two filters together, 2M multiplications occur for each symbol time. However, in view of what was said above about operation of the block MOD, it would seem possible to halve the total number of multiplications, making it M. Indeed, during one symbol time, the multiplications are performed alternately on the symbols Ii or Qi.

Operation of the circuit of FIG. 1 assumes synchronism of all the frequencies in play (fb, fs, fc, fo), with:

$$fc = fs \times K$$

$$fo = fc/4 = fs \times (K/4).$$

In the modulator of FIG. 1, the input operations for the block S/P are performed at a frequency fb, the operations for the block MAP are performed at a frequency fs, and all the operations for the remainder of the circuit are performed at the frequency fc. Consequently, the modulated carrier QAM output from the block DAC consists of the discrete samples which succeed each other at frequency fc.

Figure 2:
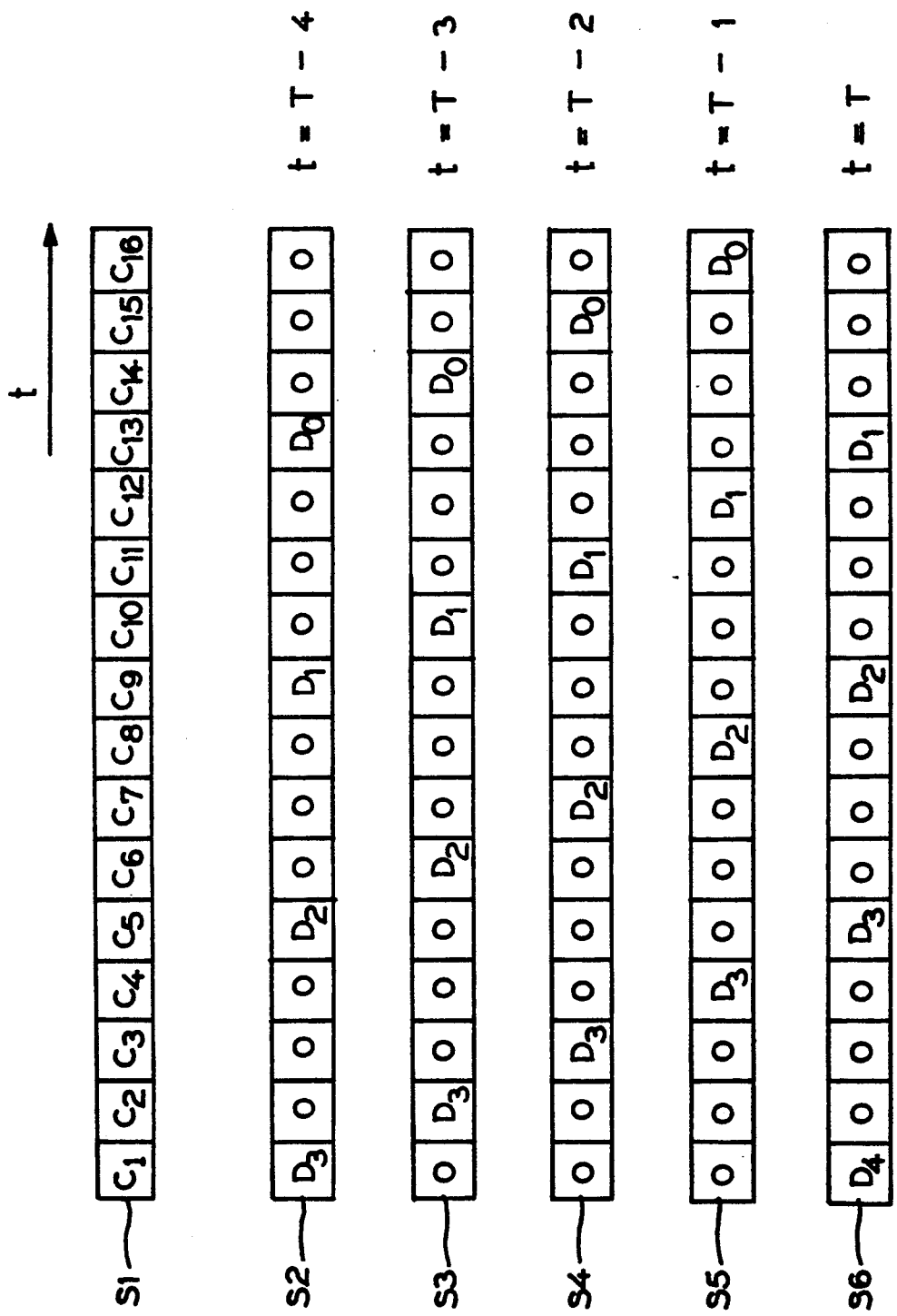
FIG. 2 shows the temporal evolution of a string of symbols developed by the circuit of FIG. 1.

FIG. 2 shows the temporal evolution of the content of the registers of one of the two filters FIR1 or FIR2 without distinction (FIG. 1) in the case where K=4, M=4, and p=16.

With reference to FIG. 2, there can be seen the array S1 of the multiplicative coefficients C1, . . . Cp which are supplied to the corresponding second inputs of the multipliers M1, . . . Mp (FIG. 1).

Opposite the array S1 there are seen five sequences indicated by S2, S3, S4, S5 and S6 aligned one under the other, each one comprising 16 samples for the symbols Ii or Qi (FIG. 1). The sequence S6 refers to a present interval of time T. The sequences S5, S4, S3, and S2 refer to time intervals indicated above by T−1, T−2, T−3, T−4.

Starting from the sequence S2 which includes samples of four complete symbols indicated by D3, D2, D and D0, each subsequent sequence is obtained by shifting all the samples of the previous sequence to the right with loss of the last sample, and introducing on the left a new sample D4 in S6.

As may be seen, the symbols inside the sequences, in this case K=4, are made up of a sample of the symbol and 3 samples of all zeros.

The filtered symbols Io and Qo are obtained by multiplying at every interval T each sample of the sequence by the corresponding coefficient and adding all the products together.

Therefore, ignoring the null products, the flow of symbols indicated, for example by Io, will have in the various instants the following expressions:

$$Io(T-4) = D3 \times C1 + D2 \times C5 + D1 \times C9 + D0 \times C13$$

$$Io(T-3) = D3 \times C2 + D2 \times C6 + D1 \times C10 + D0 \times C14$$

$$Io(T-2) = D3 \times C3 + D2 \times C7 + D1 \times C11 + D0 \times C15$$

$$Io(T-1) = D3 \times C4 + D2 \times C8 + D1 \times C12 + D0 \times C16$$

$$Io(T) = D4 \times C1 + D3 \times C5 + D2 \times C9 + D1 \times C13$$

The flow of symbols indicated by Qo has a similar expression.

Figure 3:
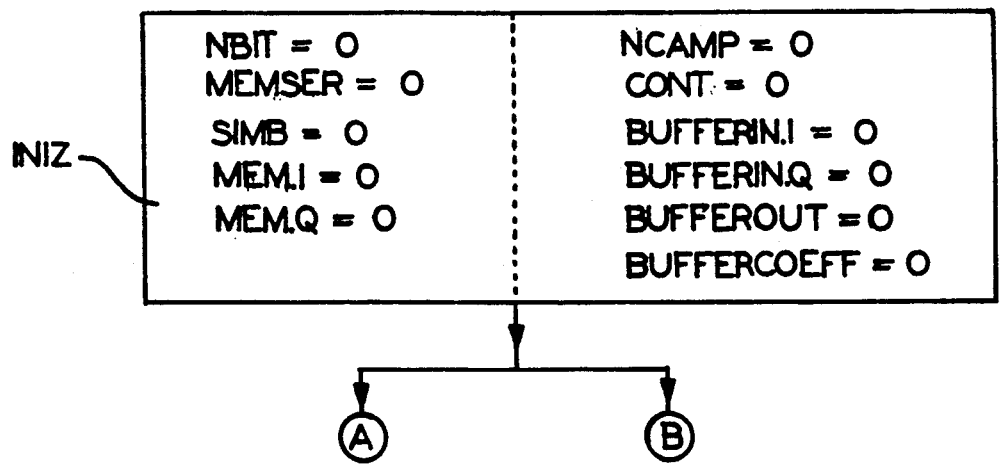
FIGS. 3, 4, and 5 represent flow charts of the phases provided by a digital signal processor (DSP) which characterize the process provided by a digital signal processor (DSP) which is an object of the present invention.
Figure 4:
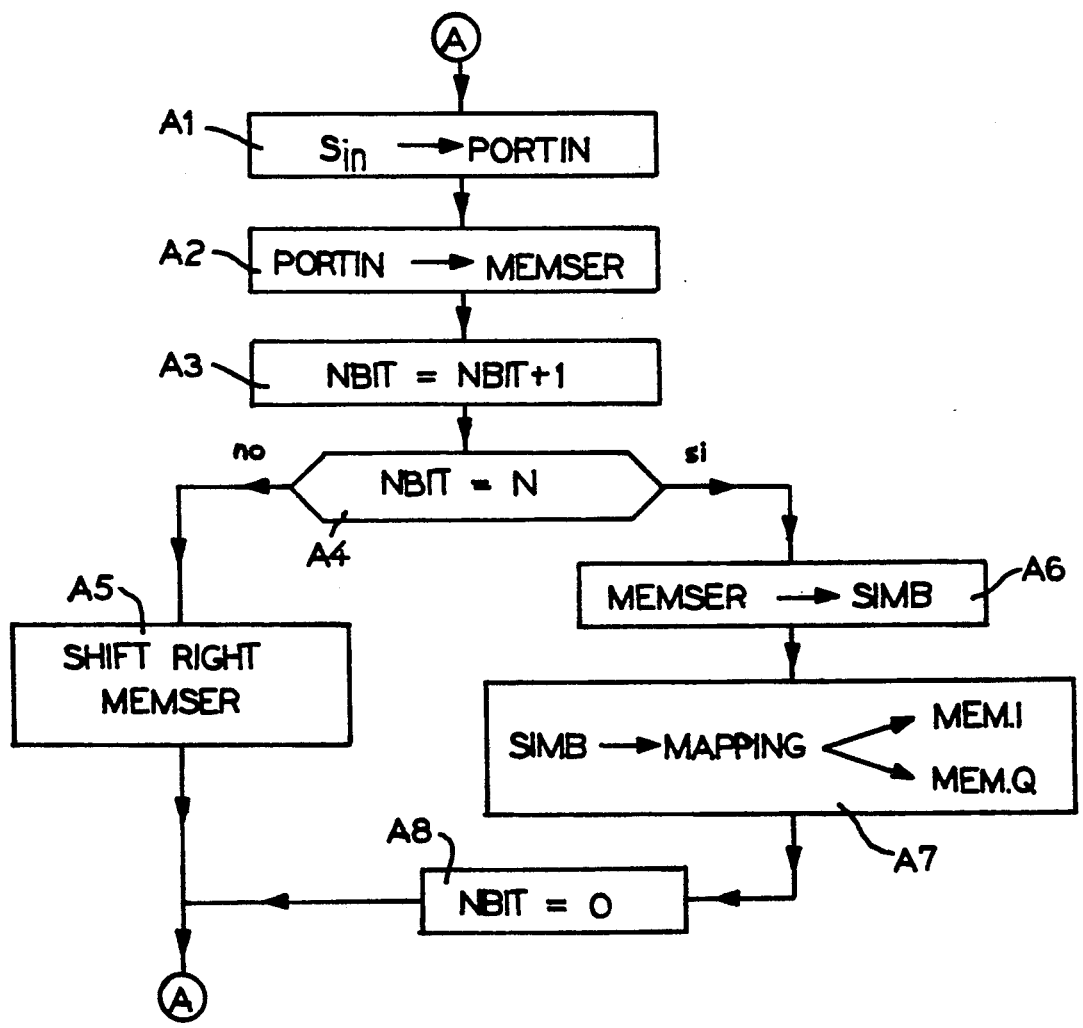
Figure 5:
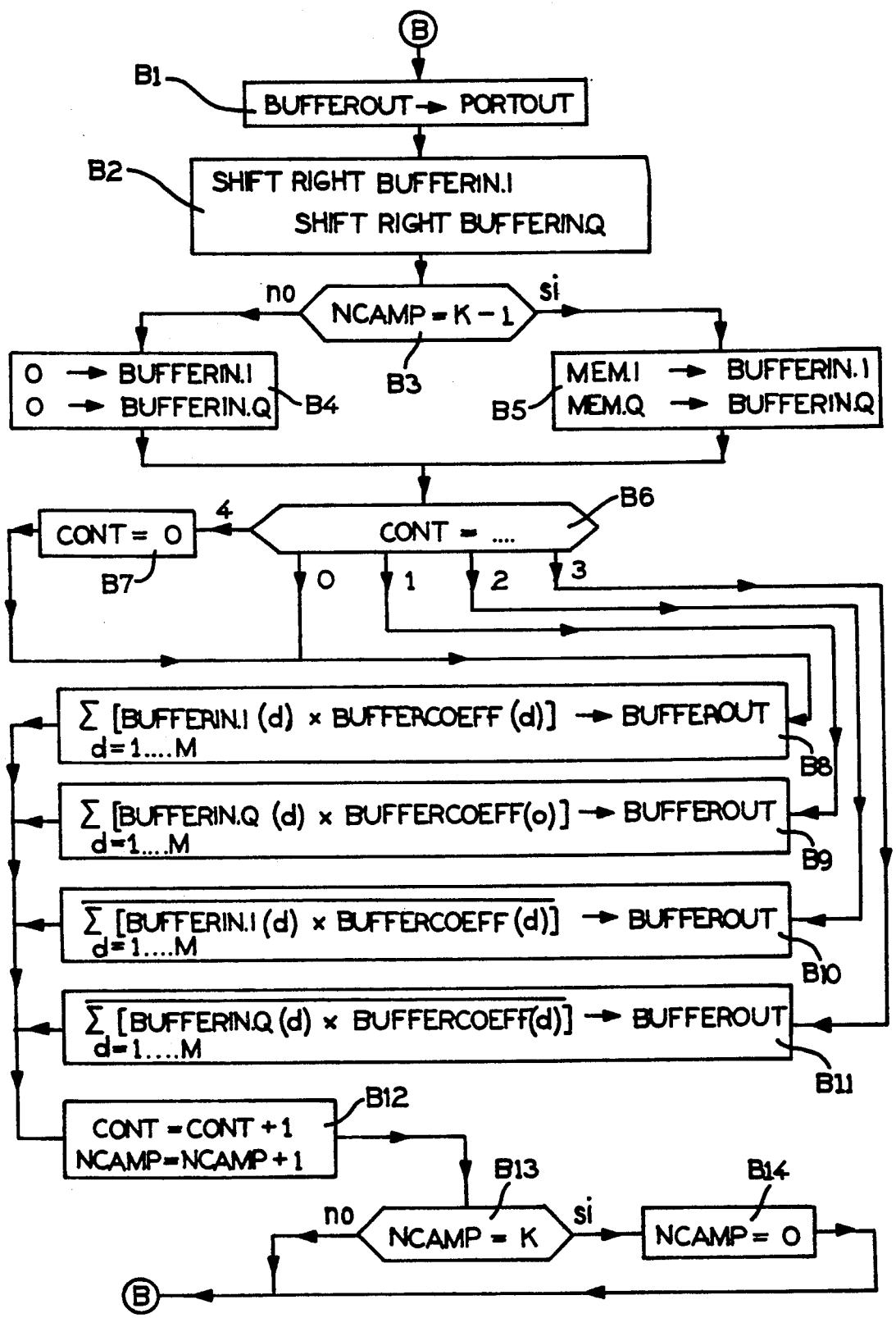

FIGS. 3, 4, and 5 illustrated a possible flow chart microprogram memorized in a microprocessor for the embodiment of the modulation process in question for the circuit of FIG. 1. In view of what was said above, it is observed that the circuit of FIG. 1 is a hypothetical circuit, given only for explanatory purposes. The actual implementation shown in FIGS. 3, 4, and 5 minimizes the number of operations and the number of memory registers.

As a nonlimiting example, it would be possible to provide the modulation process by means of the microprocessor produced by the Analog Devices Co. under stock number ADSP-2100.

The information contained in the operating manuals of the microprocessor together with the detailed description of the flow chart shown in FIGS. 3, 4, and 5 are sufficient for those skilled in the art to provide a QAM modulator circuit of FIG. 1 in accordance with the modulation process which is the object of the invention.

The modulator circuit in the embodiment using a microprocessor comprises:
- the microprocessor mentioned above or its equivalent,
- an oscillator circuit for generation of the clock signal of the microprocessor,
- a synchronization circuit for the generation of appropriate interruption signals to send to the microprocessor, and
- the digital/analog converter DAC (FIG. 1) and the reconstruction filter FRIC (FIG. 1).

The synchronization circuit comprises an oscillator for generation of a main frequency and one or more frequency dividers for obtaining the frequencies fb, fc and respective interruption signals INTERR(fb) and INTERR(fc) in synchrony with these frequencies.

The dividers mentioned are selected from among those commonly found in the trade and are appropriately initialized with the values of K and N for the particular modulator implemented, after which the frequencies fb and fc are generated by dividing the main frequency by appropriate values derived from K and N.

The serial signal $S_{in}$ (FIG. 1) reaches an input port PORTIN of the microprocessor and is loaded in shift register MEMSER under the control of the signal INTERR(fb). This signal times the beginning of a first cycle for acquisition of the input signal $S_{in}$ and generation of the symbols Ii and Qi (FIG. 1).

The signal INTERR(fc) times a second cycle, including processing of all the other phases of the modulation process including output. In the output phase, a sample belonging to the modulated digital carrier QAM is transferred from an internal register BUFFEROUT, in which it is found, to an output port PORTOUT connected to the digital/analog converter DAC (FIG. 1).

More precisely, the sample present in BUFFEROUT is the one which, among the samples Io, Qo, $\overline{Io}$, $\overline{Qo}$ (FIG. 1), has to be converted into analog.

With reference to FIGS. 3, 4, and 5, it is noted that the overall flow chart includes:
- an initialization phase INIZ shown in FIG. 3,
- the abovesaid first acquisition cycle of the signal $S_{in}$ shown in FIG. 4 by the phases included between points A and A', and
- the above said second cycle of modulation and output of the samples of the modulated digital carrier QAM shown in FIG. 5 by the phases included between points B and B'.

The two above-mentioned cycles are in practice two programs for management of the respective interruption signals INTERR(fb) and INTERR(fc); the signal INTERR(fc) has priority over the signal INTERR(fb) to avoid noise in the modulated carrier phases Sout.

The phase INIZ is performed only once at the start of the program, after which the microprocessor waits for one or the other of the signals INTERR(fb) or INTERR(fc) to address the acquisition or modulation cycle, respectively.

The points A and A' represent the starting and ending addresses of the program related to the acquisition cycle, while the points B and B' represent the starting and ending addresses of the program related to the modulation and output cycle.

In normal operation, upon arrival of the signal INTERR(fb) there is memorized in a special register the address of the modulation cycle instruction in the processing phase. After completion of the acquisition cycle, the modulation cycle resumes exactly from the point of interruption.

Upon arrival of the signal INTERR(fc), the processing and output cycle starts as stated; and at the end thereof, the microprocessor goes into standby for the next signal INTERR(fc).

During the phase INIZ, there are performed some initialization functions, including among others, zeroing of certain memory registers of the microprocessor used during processing. With reference to FIG. 3, it is noted that the following are zeroed:
- three indices indicated by NFLUS, NCAMP, and CONT associated with an equal number of counters used for counting the number of bits per symbol, the number of samples per symbol, and the number of samples per period of each in quadrature digital carrier;
- the shift register MEMSER which contains the bits of the input signal Sin;
- a register SIMB which contains the symbols obtained from Sin;
- two registers MEM.I and MEM.Q which contain the symbols Ii and Qi respectively derived from SIMB by the mapping operation;
- a register BUFFERCOEFF which contains the coefficients C1 . . . Cp as in the array S1 of FIG. 2;
- two shift registers BUFFERIN.I and BUFFERIN.Q having a length of (M) words each and used respectively for memorizing M symbols Ii and Qi corresponding with the symbols Do . . . DM of any of the sequences S2 . . . S6 of FIG. 2; and finally
- the register BUFFEROUT which contains the samples of the modulated digital carrier QAM Uo(t).

In relation to FIG. 4, the different phases are explained in detail as follows:
Point A goes to phase A1 in which a bit of the input signal $S_{in}$ is acquired from the input port PORTIN.
In the subsequent phase A2, the bit of PORTIN is transferred to the left position of the shift register MEMSER.
The index NBIT is then increased in phase A3.

In phase A4, the value of NBIT is tested; if the value is less than the predetermined number N of bits per symbol, in phase A5 the bits of the register MEMSER are shifted right. At the end of phase A5 there is a return A' to the reentry point A for the wait of a new interruption signal INTERR(fb).

If NBIT=N, the contents of MEMSER are memorized in the register SIMB in phase A6.

In the subsequent phase A7, the mapping operation for generation of the symbols Ii and Qi is performed.

In phase A8, the index NBIT is zeroed, after which there is a return A' to the point of reentry A for the wait of a new interruption signal INTERR(fb). With reference to FIG. 5:

Point B goes to phase B1 in which the contents of the output register BUFFEROUT are placed on the output port PORTOUT.

In phase B2, the value of the NCAMP index is tested. If this value is less than K, there is a jump to phase B6.

If NCAMP is equal to K, in phase B3 a shift to the right of one position of the content of the shift registers BUFFERIN.I and BUFFERIN.Q is completed.

In the subsequent phase B4, the symbols contained in the registers MEM.I and MEM.Q are transferred to the first position on the left of the registers BUFFERIN.I and BUFFERIN.Q, respectively.

In the subsequent phase B5, the NCAMP index is zeroed.

In phase B6, the value of the CONT index is tested.

The values 0, 1, 2, and 3 of CONT go to the phases B8, B9, B10, and B11 respectively in which the digital filtration of the symbols Ii and Qi is performed.

The filtration operation is done by multiplying the symbols of the registers BUFFERIN.I and BUFFERIN.Q, identified by an index (d) by appropriate coefficients of the register BUFFERCOEFF, identified by an index (y), and adding the products obtained together.

The index d undergoes unitary increases from 1 to M in a given interval T.

The expression of the index y is as follows:

$$y = kx(d-1) + NCAMP + 1$$

It allows placing the data Do ... DM belonging to the sequences S2 ... S6 of FIG. 2 in correspondence with the coefficients which in the array S1 are placed exactly above said data. This provides the dual advantage of avoiding operations whose products would be a null and useless occupation of memory of the registers BUFFERIN.I and BUFFERIN.Q with words consisting of all zeros. The phases B8, B9, B10, and B11 are placed in chronological sequence; at each present time interval T the corresponding filtered symbols Io, Qo, $\overline{Io}$, $\overline{Qo}$ are memorized in the register BUFFEROUT. The value 4 of the CONT index involves, in phase B7, zeroing of this index and return to phase B8 for cyclic repetition of the phases B8, B9, B10, and B11. Each of the phases B8, B9, B10, and B11 evolves in the same phase B12 in which the CONT and NCAMP indices are increased by one unit after which there is a return B' to point B for the wait of a new interruption signal INTERR(fc).

Although various minor changes and modifications might be proposed by those skilled in the art, it will be understood that we wish to include within the claims of the patent warranted hereon all such changes and modifications as reasonably come within out contribution to the art.

We claim as our invention:

1. A multi-level digital modulation process wherein a serial flow having a bit frequency fb is parallelized to form first words of N bits called symbols having a symbol frequency fs, and wherein from the first words second and third words are generated in synchronism respectively belonging to a channel termed "in phase" and a channel termed "in quadrature" representing components along two orthogonal axes of a vector which digitally modulates a sinusoidal carrier both in phase and in amplitude, comprising the steps of:

digitally filtering said second and third words having the symbol frequency fs and obtaining in correspondence therewith fourth and fifth filtered words, said digital filtering being carried out at a sampling frequency fc synchronous with said symbol frequency fs and corresponding to said symbol frequency fs multiplied by an appropriate number K greater than 2;

negating the value of said fourth and fifth filtered words and obtaining in correspondence therewith sixth and seventh negated filtered words; and cyclically selecting in order, at each period of said sampling frequency fc, one of said fourth, fifth, sixth, and seventh words which provide a sequence of discrete samples of said digitally modulated sinusoidal carrier.

2. A multi-level digital modulation process according to claim 1 wherein said digital filtering of said second and third words is of a transverse type with a finite pulse response in which the fourth and fifth filtered words are obtained by multiplying a first sequence of a number p of digital coefficients by a respective second and third sequence of a number $M = p/K$ of said second or third words, and summing; and wherein at each period of the frequency fs, a latest of said second and third words all products obtained in correspondence with said second and third words enter into the respective second and third sequence and an oldest of said second and third words are deleted from the respective sequences.

3. A multi-level digital modulation process according to claim 2 wherein the multiplication of said first sequence by the respective second and third sequence is implemented by multiplying each respective second and third word, identified by values of a first index d varying from 1 to M by increments of one unit in a period of said frequency fc, by a coefficient identified by values of a second index y calculated by the following expression:

$$y = KX(d-1) + NCAMP + 1$$

where NCAMP is a third index varying from zero to K by increments of one unit at each period of the frequency fc.

4. A multi-level digital modulation system, comprising:

means for providing a serial flow having a bit frequency fb which is parallelized to form first words of N bits called symbols having a symbol frequency fs;

means for generating from said first words second and third words synchronous with the first words and respectively belonging to a channel termed "in phase" and a channel termed "in quadrature" representing components along two orthogonal axes of a vector which digitally modulates a sinusoidal carrier both in phase and in amplitude;

means for digitally filtering said second and third words having a symbol frequency fs, obtaining corresponding therewith fourth and firth filtered words, said digital filtering being carried out at a sampling frequency fc synchronous with said symbol frequency fs and corresponding to said symbol frequency fs multiplied by an appropriate number K greater than 2;

means for negating a value of said fourth an fifth filtered words and obtaining in correspondence therewith sixth and seventh negated filtered words; and means for cyclically selecting in order, at each period of said sampling frequency fc, one of said fourth, fifth, sixth, and seventh words which provide a sequence of discrete samples of said digitally modulated sinusoidal carrier.

5. A system according to claim 4 wherein said means for providing, means for generating, means for digitally filtering, means for negating, and means for cyclically selecting comprise a single processor means for processing digital signals in real time.

6. A system according to claim 4 wherein said means for digitally filtering the second and third words are two equal transverse digital filters with a finite pulse response having a number p of digital coefficients forming a first sequence, wherein said fourth and fifth filtered words are obtained by multiplying said first sequence by a respective second and a third sequence of a number $M=p/K$ of said second or third words, and summing all products obtained in correspondence with said second and third words; and wherein, at each period of the frequency fs, a latest of said second and third words enter into the respective second and third sequence and an oldest of said second and third words are deleted from the respective sequences.

7. A system according to claim 6 wherein the multiplication of said first sequence by the respective second and third sequence is implemented by multiplying each respective second and third word, identified by values of a first index d varying from 1 to M by increments of one unit in a period of said frequency fc, by a coefficient identified by values of a second index y calculated by the following expression:

$$y = KX(d-1) + NCAMP + 1$$

where NCAMP is a third index varying from zero to K by increments of one unit at each period of the frequency fc.

* * * * *